US007548349B2

(12) United States Patent
Koichi et al.

(10) Patent No.: US 7,548,349 B2
(45) Date of Patent: Jun. 16, 2009

(54) IMAGE FORMING APPARATUS TO PREVENT TONER DEFORMATION

(75) Inventors: Yasushi Koichi, Kanagawa (JP); Mitsuo Aoki, Shizuoka (JP); Bing Shu, Shizuoka (JP); Koji Suzuki, Kanagawa (JP); Shigeru Watanabe, Kanagawa (JP); Tadashi Kasai, Tokyo (JP); Yutaka Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1225 days.

(21) Appl. No.: 10/650,754

(22) Filed: Aug. 29, 2003

(65) Prior Publication Data

US 2005/0030595 A1 Feb. 10, 2005

(30) Foreign Application Priority Data

Aug. 30, 2002 (JP) ............................ 2002-254965

(51) Int. Cl.
*H04N 1/04* (2006.01)
*G06K 15/00* (2006.01)

(52) U.S. Cl. ...................................... 358/300; 358/474

(58) Field of Classification Search ................. 358/300, 358/296, 400, 474, 471; 347/129, 112, 111
See application file for complete search history.

(56) References Cited

U.S. PATENT DOCUMENTS 5,812,917 A 9/1998 Iwata et al.
5,887,224 A 3/1999 Mizuishi et al.
5,994,016 A 11/1999 Kuramoto et al.
6,006,050 A 12/1999 Watanabe et al.
6,055,388 A 4/2000 Watanabe et al.
6,060,201 A 5/2000 Kinoshita et al.
6,112,046 A 8/2000 Suzuki et al.
6,120,960 A 9/2000 Aoki et al.
6,212,351 B1 4/2001 Kawagoe et al.
6,248,488 B1 6/2001 Kinoshita et al.
6,403,275 B1 6/2002 Kuramoto et al.
6,549,742 B1 * 4/2003 Chigono et al. ............. 399/174
6,593,048 B2 7/2003 Sasaki et al.
7,018,765 B2 * 3/2006 Uchida et al. ............ 430/110.3
2005/0030595 A1 2/2005 Koichi et al.

FOREIGN PATENT DOCUMENTS

EP 0 666 518 A2 8/1995

(Continued)

OTHER PUBLICATIONS

3M; Resistivity, Resistance, Resistance to Ground; Feb. 1990; Technical Brief No. 119.*

(Continued)

*Primary Examiner*—Gabriel I Garcia
(74) *Attorney, Agent, or Firm*—Oblon, Spivak, McClelland, Maier & Neustadt, P.C.

(57) ABSTRACT

In an image forming apparatus configured to electrostatically transfer a toner image formed on an image carrier to a recording medium with image transferring means of the present invention, pressure is applied between the image carrier and the image transferring means. Toner is provided with relatively high hardness in accordance with the pressure beforehand. Image transfer is effected by reducing a potential difference between the image carrier and the recording medium while maintaining an electric field around the toner the same.

25 Claims, 13 Drawing Sheets

| | TONER HARDNESS | TONER COHESION DEGREE | TONER VOLUMETRIC RESISTANCE | DRUM COEFFICIENT OF FRICTION | TONER GRAIN SIZE |
|---|---|---|---|---|---|
| PRESCRIPTION 1 | 8 | 45% | $8.5\times10^{9}\Omega$cm | 0.70 | 8.5 μm |
| PRESCRIPTION 2 | 6 | 8% | $5.5\times10^{8}\Omega$cm | 0.80 | 5.5 μm |
| PRESCRIPTION 3 | 11 | 55% | $8.8\times10^{9}\Omega$cm | 0.75 | 7.5 μm |
| PRESCRIPTION 4 | 14 | 20% | $4.2\times10^{7}\Omega$cm | 0.75 | 9.5 μm |
| PRESCRIPTION 5 | 10 | 15% | $9.5\times10^{8}\Omega$cm | 0.75 | 8.5 μm |
| PRESCRIPTION 6 | 11 | 41% | $9.8\times10^{8}\Omega$cm | 0.80 | 6.5 μm |
| PRESCRIPTION 7 | 10 | 25% | $3.5\times10^{7}\Omega$cm | 0.75 | 8.5 μm |
| PRESCRIPTION 8 | 10 | 35% | $1.8\times10^{9}\Omega$cm | 0.60 | 8.5 μm |

FOREIGN PATENT DOCUMENTS

| | | | | |
|---|---|---|---|---|
| EP | 0 856 783 | A2 | | 8/1998 |
| JP | 3-59568 | | | 3/1991 |
| JP | 6-186769 | | | 7/1994 |
| JP | 10-171151 | | | 6/1998 |
| JP | 10-268554 | | | 10/1998 |
| JP | 11-24449 | | | 1/1999 |
| JP | 2000-181252 | | | 6/2000 |
| JP | 2001-134007 | A | | 5/2001 |
| JP | 2001-175097 | | | 6/2001 |
| JP | 2002-72708 | | | 3/2002 |
| JP | 2002-116637 | | | 4/2002 |
| JP | 2002182476 | A | * | 6/2002 |
| JP | 2002-229346 | | | 8/2002 |

OTHER PUBLICATIONS

U.S. Appl. No. 10/650,754, filed Aug. 29, 2003, Koichi, et al.
U.S. Appl. No. 10/800,636, filed Mar. 16, 2004, Hasegawa, et al.
U.S. Appl. No. 10/650,754, filed Aug. 29, 2003, Koichi et al.
U.S. Appl. No. 10/921,993, filed Aug. 20, 2004, Amemiya et al.
U.S. Appl. No. 10/921,923, filed Aug. 20, 2004, Koike et al.
U.S. Appl. No. 11/197,548, filed Aug. 5, 2005, Kasai et al.
U.S. Appl. No. 11/950,114, filed Dec. 4, 2007, Shitara, et al.
U.S. Appl. No. 11/956,378, filed Dec. 14, 2007, Shu, et al.
U.S. Appl. No. 11/738,342, filed Apr. 20, 2007, Kato, et al.
U.S. Appl. No. 11/408,031, filed Apr. 21, 2006, Shu, et al.
U.S. Appl. No. 09/905,872, filed Jul. 17, 2001, Sasaki et al.
U.S. Appl. No. 09/965,826, filed Oct. 1, 2001, Higuchi et al.
U.S. Appl. No. 09/996,585, filed Nov. 30, 2001, Higuchi et al.
U.S. Appl. No. 10/052,433, filed Jan. 23, 2002, Tamiya et al.
U.S. Appl. No. 10/077,813, filed Feb. 20, 2002, Matsuda et al.
U.S. Appl. No. 10/077,752, filed Feb. 20, 2002, Iwamoto et al.
U.S. Appl. No. 10/101,756, filed Mar. 21, 2002, Sasaki et al.
U.S. Appl. No. 10/151,103, filed May 21, 2002, Kondo et al.
U.S. Appl. No. 10/158,069, filed May 31, 2002, Matsuda et al.
U.S. Appl. No. 10/252,070, filed Sep. 23, 2002, Aoki et al.
U.S. Appl. No. 10/329,538, filed Dec. 27, 2002, Higuchi et al.
U.S. Appl. No. 10/355,039, filed Jan. 31, 2003, Suzuki et al.
U.S. Appl. No. 10/424,077, filed Apr. 28, 2003, Suzuki et al.
U.S. Appl. No. 10/631,727, filed Aug. 1, 2003, Suzuki, et al.
U.S. Appl. No. 12/208,801, filed Sep. 11, 2008, Ogawa, et al.

* cited by examiner

FIG. 9

| | TONER HARDNESS | TONER COHESION DEGREE | TONER VOLUMETRIC RESISTANCE | DRUM COEFFICIENT OF FRICTION | TONER GRAIN SIZE |
|---|---|---|---|---|---|
| PRESCRIPTION 1 | 8 | 45% | 8.5×10$^9$Ωcm | 0.70 | 8.5 μm |
| PRESCRIPTION 2 | 6 | 8% | 5.5×10$^8$Ωcm | 0.80 | 5.5 μm |
| PRESCRIPTION 3 | 11 | 55% | 8.8×10$^9$Ωcm | 0.75 | 7.5 μm |
| PRESCRIPTION 4 | 14 | 20% | 4.2×10$^7$Ωcm | 0.75 | 9.5 μm |
| PRESCRIPTION 5 | 10 | 15% | 9.5×10$^8$Ωcm | 0.75 | 8.5 μm |
| PRESCRIPTION 6 | 11 | 41% | 9.8×10$^8$Ωcm | 0.80 | 6.5 μm |
| PRESCRIPTION 7 | 10 | 25% | 3.5×10$^7$Ωcm | 0.75 | 8.5 μm |
| PRESCRIPTION 8 | 10 | 35% | 1.8×10$^9$Ωcm | 0.60 | 8.5 μm |

FIG. 10

| PRESSURE/CURRENT | 0.03 μA/cm | 0.05 μA/cm | 0.20 μA/cm | 0.30 μA/cm |
|---|---|---|---|---|
| 0.05 N/cm | 22%(×) | 68%(×) | 81%(○) | 78%(△) |
| 1.0 N/cm | 25%(×) | 80%(○) | 85%(○) | 80%(△) |
| 5.0 N/cm | 40%(×) | 85%(○) | 81%(○) | 75%(△) |
| 10.0 N/cm | 52%(×) | 88%(△) | 72%(△) | 70%(△) |

FIG. 11

| PRESSURE/CURRENT | 0.03 μA/cm | 0.05 μA/cm | 0.20 μA/cm | 0.30 μA/cm |
|---|---|---|---|---|
| 0.05 N/cm | ○ | ○ | Δ | × |
| 1.0 N/cm | ○ | ○ | ○ | × |
| 5.0 N/cm | ○ | ○ | ○ | × |
| 10.0 N/cm | ○ | ○ | ○ | × |

FIG. 12

| PRESSURE/CURRENT | 0.03 μA/cm | 0.05 μA/cm | 0.20 μA/cm | 0.30 μA/cm |
|---|---|---|---|---|
| 0.05 N/cm | ○ | ○ | ○ | ○ |
| 1.0 N/cm | ○ | ○ | ○ | ○ |
| 5.0 N/cm | ○ | ○ | ○ | ○ |
| 10.0 N/cm | ○ | △ | △ | △ |

FIG. 13

| | IMAGE TRANSFER RATIO RANK | TONER SCATTER RANK |
|---|---|---|
| PRESCRIPTION 1 | ○ | ○ |
| PRESCRIPTION 2 | × | × |
| PRESCRIPTION 3 | △ | △ |
| PRESCRIPTION 4 | × | △ |
| PRESCRIPTION 5 | ○ | × |
| PRESCRIPTION 6 | △ | ○ |
| PRESCRIPTION 7 | × | ○ |
| PRESCRIPTION 8 | ○ | ○ |

IMAGE FORMING APPARATUS TO PREVENT TONER DEFORMATION

BACKGROUND OF THE INVENTION

1. Field of the Invention

The present invention relates to a copier, printer, facsimile apparatus or similar image forming apparatus and more particularly to an image transferring method and toner for an image forming apparatus.

2. Description of the Background Art

Generally, an electrophotographic image forming apparatus needs a number of image forming steps. A copier, for example, converts a document image to an electric signal with a scanner or optics while a printer directly inputs a document image in a plotter in the form of a signal. Writing means scans a photoconductive element or image carrier with a laser beam in accordance with the electric signal to thereby form a latent image. Toner or similar fine colored powder is deposited on the latent image to thereby produce a corresponding toner image. The toner image is then transferred from the photoconductive element to a sheet or recording medium. Today, it is a common practice to sequentially transfer toner images of three to four different colors to an intermediate image transfer body one above the other and then transfer the resulting composite color image to a sheet. In any case, the toner is fixed on the sheet by heat and pressure.

The consecutive steps stated above all involve the causes of image quality degradation. Particularly, development and image transfer noticeably deteriorate image quality, as known in the art. More specifically, during development, toner electrostatically deposits on the photoconductive element under the action of an electric field on the photoconductive element. Therefore, it is likely that the toner deposits on the photoconductive element over a larger area than the latent image or that the toner image is blurred due to rubbing of carrier grains. Recently, this problem is coped with by reducing toner grain size, using spherical toner or reducing carrier grain size by way of example.

As for image transfer, a sheet, conveyed in synchronism with the movement of the photoconductive element carrying the toner image thereon, is brought into contact with the photoconductive element, so that the toner image is electrostatically transferred to the sheet by an electric field. The problem with image transfer is that the toner is electrostatically scattered at positions preceding and following the position where the sheet and photoconductive element contact each other or that the toner image is blurred. While image quality is degraded during fixation as well, this degradation has customarily been improved by using an elastic fixing roller or reducing a nip for fixation by way of example.

Various schemes have heretofore been proposed to improve image quality in relation to image transfer. Japanese Patent Laid-Open Publication No. 2000-155472, for example, proposes a specific position of an image transfer roller and specific contact pressure. Japanese Patent Laid-Open Publication No. 2000-221800 proposes to press a float roller against a photoconductive element. Japanese Patent Laid-Open Publication No. 2001-209255 teaches specific volumetric resistance of an intermediate image transfer body and specific properties of toner. Further, Japanese Patent Laid-Open Publication No. 7-5776 discloses a method of applying an image transfer bias to a press roller while using an amorphous silicon photoconductive element and capsule toner. Moreover, Japanese Patent Laid-Open Publication Nos. 5-107796 and 6-230599 each propose a fixing method using capsule toner and a press roller.

However, the capsule toner and press roller scheme is not desirable because capsule toner has various problems in practical use. Particularly, development and fixation are not compatible with each other while cost is excessively high. While toner produced by polymerization has recently been proposed to uniform image quality, toner scattering, blur and other problems particular to image transfer and ascribable to discharge are left unsolved.

SUMMARY OF THE INVENTION

It is an object of the present invention to provide an image forming apparatus capable of accurately obviating toner scattering and blur ascribable to image transfer to thereby insure sharp images, an image transferring method, and toner for use in the image forming apparatus.

In an image forming apparatus configured to electrostatically transfer a toner image formed on an image carrier to a recording medium with image transferring means of the present invention, pressure is applied between the image carrier and the image transferring means. Toner is provided with relatively high hardness in accordance with the pressure beforehand. Image transfer is effected by reducing a potential difference between the image carrier and the recording medium while maintaining an electric field around the toner the same.

BRIEF DESCRIPTION OF THE DRAWINGS

The above and other objects, features and advantages of the present invention will become more apparent from the following detailed description taken with the accompanying drawings in which:

FIG. 9 is a table listing specific toner prescriptions;

FIG. 10 is a table listing the results of estimation of image transfer ratio conducted with Example 1;

FIG. 11 is a table listing the results of estimation of toner scattering conducted with Example 1;

FIG. 12 is a table listing the results of estimation of local omission of an image conducted with Example 1; and FIG. 13 is a table listing the results of estimation of image transfer quality conducted with the specific prescriptions in Example 2.

DESCRIPTION OF THE PREFERRED EMBODIMENT

Figure 1:
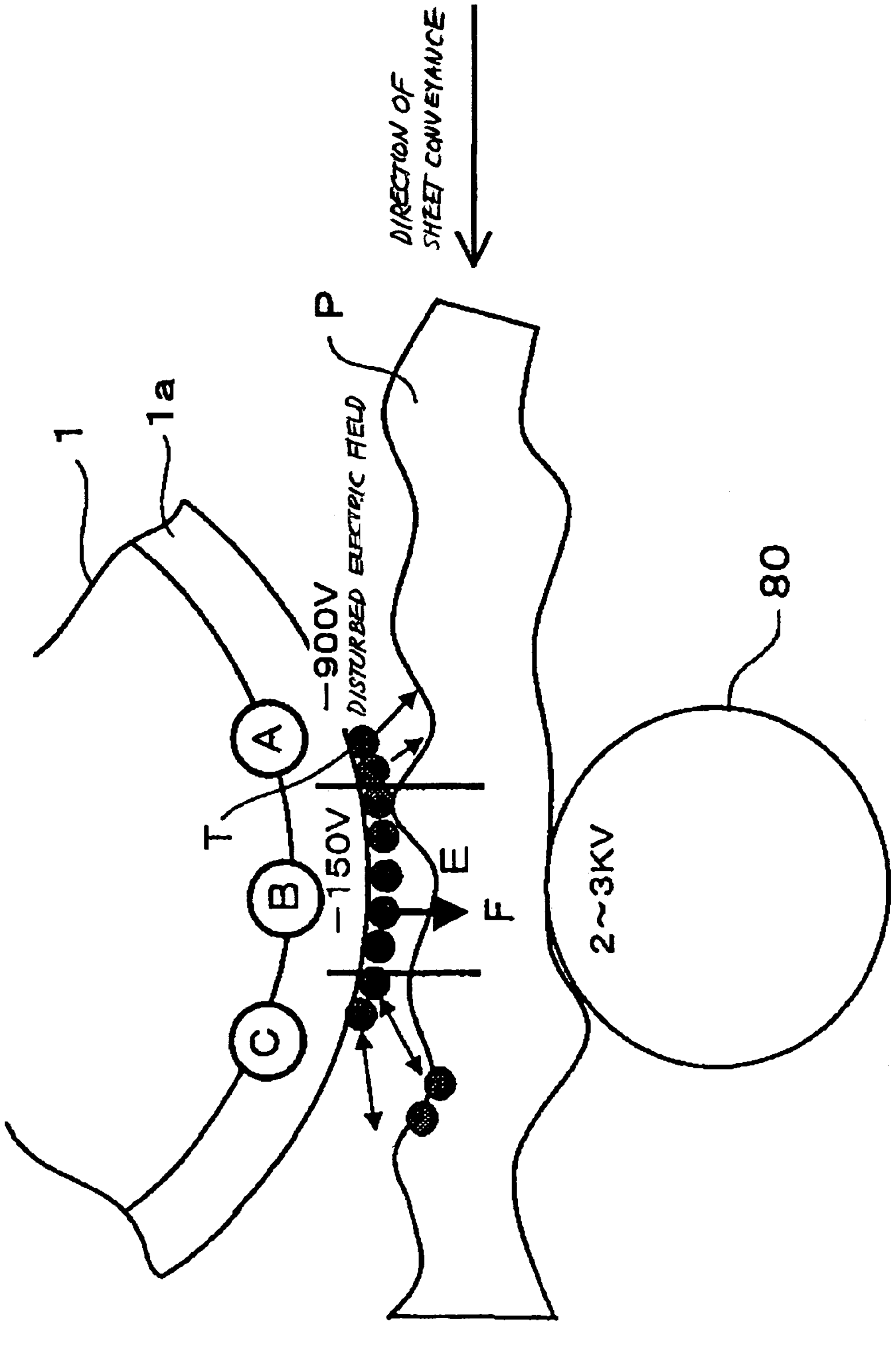
FIG. 1 PRIOR ART
FIG. 1 is a view for describing the mechanism of toner scattering.

To better understand the present invention, the mechanism of toner scattering to occur in the event of image transfer will be described with reference to FIG. 1. As shown, toner scattering occurs due to the influence of an electric field in zones A and C around an image transfer zone B and where a sheet or recording medium P and a photoconductive drum or image carrier 1 do not contact each other. The drum 1 has a photoconductive layer 1*a* on its surface. An image transfer roller or image transferring means 80 faces the drum 1 with the intermediary of the sheet P. Labeled T is toner or a toner layer.

More specifically, in the zone A preceding the image transfer zone B, the toner T flies from the drum 1 to the sheet P due to the charge of the sheet P and electric field, resulting in toner scattering. In the zone C following the image transfer zone B, when the sheet P, electrostatically adhered to the drum 1 by being charged during image transfer, parts from the drum 1, separation discharge occurs and causes the toner T to be scattered, also resulting in toner scattering.

The principle of the present invention for solving the above problems will be described hereinafter. The present invention is characterized by effecting image transfer with pressure higher than one customarily used for electrostatic image transfer and an electric field weaker than one customarily used for electrostatic image transfer. It is therefore necessary to provide an image transfer roller with a hard elastic structure and volumetric resistance lower than that of a sheet. Use is made of hard toner to cope with the high pressure.

Further, the surface resistance of the image transfer roller should preferably be higher than volumetric resistance, so that an electric field for image transfer acts only in the same direction as the movement of toner (image transfer). The surface of a sheet, constituted by fibers entangled together, is uneven and not regularly uneven. The surface of an ordinary sheet, e.g., a sheet Type 6000 (trade name) available from RICOH CO., LTD. has unevenness of about 40 μm; only the projections of the uneven surface contact a photoconductive element when the sheet is being conveyed at the time of image transfer.

While the recesses of the uneven surface of a sheet form an air gap of 40 μm each, toner usually has a grain size of about 6 μm, which is about one-seventh of the air gap size. Therefore, toner grains present in the recesses do not contact the sheet and do not move unless an electric field stronger than one acting on the projections is applied. Such a strong electric field, however, causes separation discharge to occur when the sheet parts from the photoconductive element after image transfer, bringing about toner scattering and blur.

The phenomenon stated above occurs just before the sheet contacts the photoconductive element also, so that a weak electric field is the key to the improvement of image quality during image transfer. Discharge occurs between the recesses and the photoconductive element (non-image portion in the case of negative-to-positive development) and between the projections and recesses as well. Consequently, toner grains at positions where they should be transferred move in the direction of discharge, resulting in toner scattering and blur.

The present invention realizes an entirely new image transfer system that increases pressure for image transfer to allow the electric field to be weakened without lowering image transfer efficiency and uses toner improved to obviate image degradation despite such pressure.

Further, the toner used in the present invention is cohesive enough to be free from scattering when subjected to separation discharge. When toner grains with strong binding force are connected together, they move little after image transfer even when subjected to separation discharge.

The image transfer mechanism on which the present invention is based is represented by the following equations. Assuming that the mobility of toner is f, then the mobility is expressed as:

$$f=qE \quad (1)$$

where q denotes the amount of charge deposited on the photoconductive element, toner and sheet, and E denotes an electric field acting between the photoconductive element and the sheet.

The electric field E is expressed as:

$$E=(Vh-Vpc)/((dp/\in p)+(dt/\in t)+(dpc/\in p)+g) \quad (2)$$

where Vh−Vpc denotes a potential difference acting on the photoconductive element and roller, dp/∈p denotes the dielectric thickness of the sheet, dt/∈t denotes the dielectric thickness of the toner, dpc/∈p denotes the dielectric thickness of the photoconductive element, and g denotes the air gap.

The pressure higher than conventional one increases the number of positions where the projections of the sheet contact the photoconductive element to thereby reduce the apparent dielectric thickness of the sheet and air gaps g. It is therefore possible to lower voltage for a given electric field effect.

However, not all the air gaps g of the recesses disappears. To cope with this problem, the present invention uses highly cohesive toner. Further, to protect the toner from deformation ascribable to the high pressure, the present invention provides the toner with optimum hardness as well as optimum cohesiveness. The toner is insulative and high resistance so as to be transferred by the weak electric field.

The high pressure is not usable unless the image transfer roller is rigid. However, because the surface of the sheet contacting the image transfer roller is also uneven, the present invention provides the image transfer roller with an elastic structure in order to evenly press the roller by scattering stress.

Moreover, considering the fact that cohesive toner grains strongly adhere not only to each other but also to the photoconductive element and sheet, the present invention reduces the surface resistance of the photoconductive element to thereby promote parting of the toner.

Figure 2:
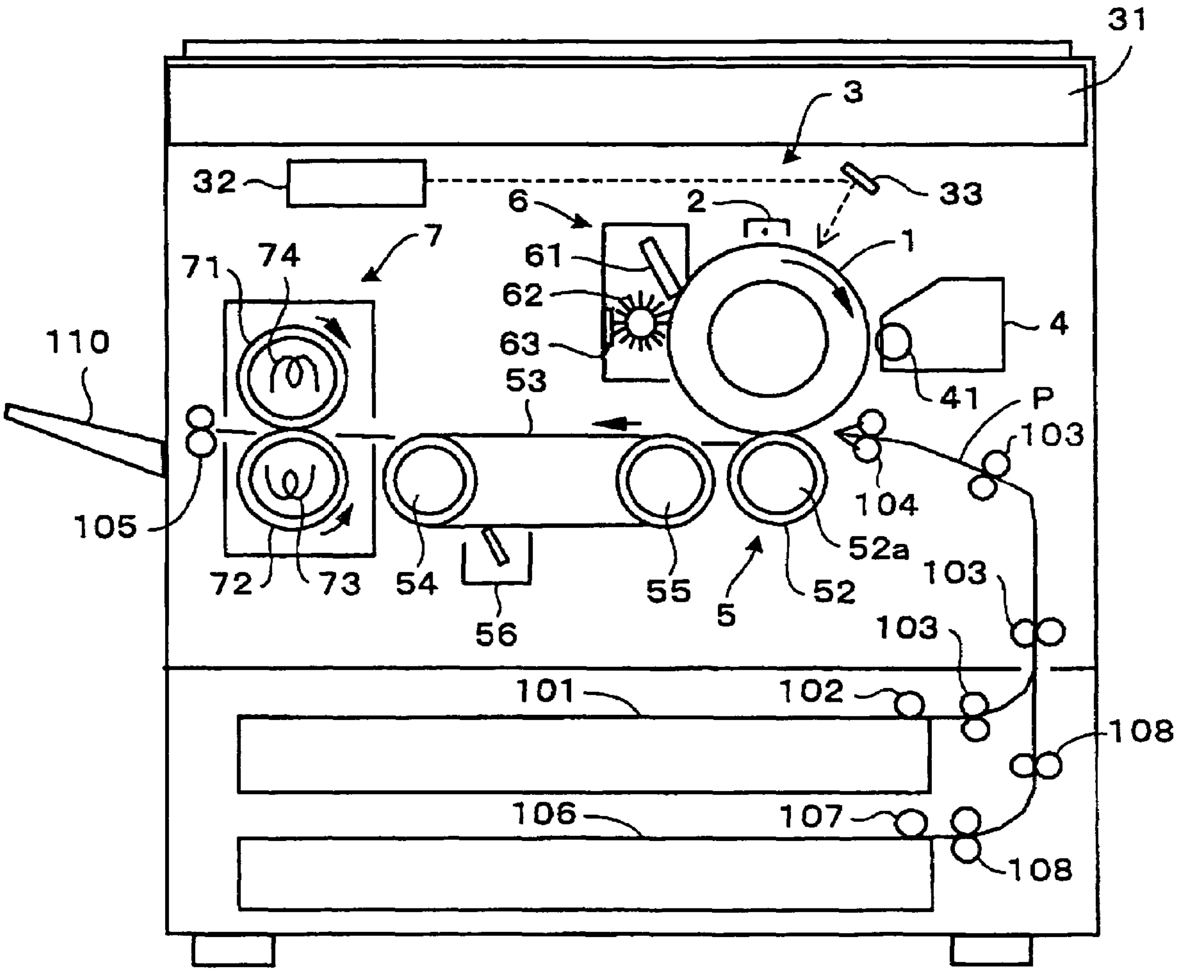
FIG. 2 is a view showing an image forming apparatus embodying the present invention.

Referring to FIG. 2, an image forming apparatus embodying the present invention and configured to effect an electrophotographic process is shown. As shown, the image forming apparatus includes a photoconductive drum or image carrier 1. Charging means 2, exposing means 3, image transferring and conveying means 5, cleaning means 6 and fixing means 7 are sequentially arranged around the drum 1 in this order in the direction of rotation of the drum 1, which is indicated by an arrow in FIG. 1.

A scanner 31 reads a document image and sends an image signal representative of the document image to the exposing means 3. The exposing means 3 scans the surface of the drum 1, which is uniformly charged by the charging means 2, with a laser beam modulated in accordance with the image signal via a mirror 33, thereby forming a latent image on the drum 1. For the drum 1, use may be made of an OPC (Organic PhotoConductor), amorphous silicon or similar conventional photoconductor.

The developing means 41 develops the latent image with toner to thereby produce a corresponding toner image. A sheet or recording medium P is paid out from designated one of sheet trays 101 and 106 by a pickup roller 102 or 107 assigned to the sheet tray. The sheet P is then conveyed by roller pairs 103 and 108 toward a registration roller pair 104. The registration roller pair 104 stops the sheet P in order to correct skew and then starts conveying it toward an image transfer station at such timing that the leading edge of the sheet P meets the leading edge of the toner image formed on the drum 1.

At the image transfer station, a bias for image transfer is applied between the drum 1 and an image transfer roller or image transferring means included in the image transferring and conveying means 5. As a result, the toner image is transferred from the drum 1 to the sheet P reached the image transfer station. A belt conveyor 53, also included in the image transferring and conveying means 5, conveys the sheet P carrying the toner image to the fixing means 7. After the toner image has been fixed on the sheet P by the fixing means 7, the sheet P is driven out to a print tray 110 by an outlet roller pair 105.

After the image transfer, the cleaning means 6 removes toner and impurities left on the drum 1. In the illustrative embodiment, the cleaning means 6 includes a cleaning blade 61, a cleaning brush 62, and a friction reducing agent 63. A quenching lamp, not shown, discharges the surface of the drum 1 cleaned by the cleaning means 6 to thereby prepare the drum 1 for the next image formation.

The image transfer roller 52 is made up of a metallic core 52*a* and an elastic layer formed on the core 52*a*. The belt conveyor 53 is passed over a drive roller 54 and a driven roller 55 and caused to turn by the drive roller 54 while being cleaned by belt cleaning means 56.

The fixing means 7 includes a heat roller 71 accommodating a halogen lamp or similar heat source 74 and a press roller 72 also accommodating a halogen lamp or similar heat source 73. The heat roller 71 and press roller 72 are pressed against each other by pressure of 9.3 $N/cm^2$, forming an about 10 mm wide nip. Drive means, not shown, causes the fixing means 7 to convey the sheet P while nipping it. The heat source 74 is controlled to maintain the surface of the heat roller 71 at preselected temperature. The toner image on the sheet P is melted by heat and pressure while being conveyed by the heat roller 71 and press roller 72 and is then cooled off to be thereby fixed on the sheet P.

Figure 3:
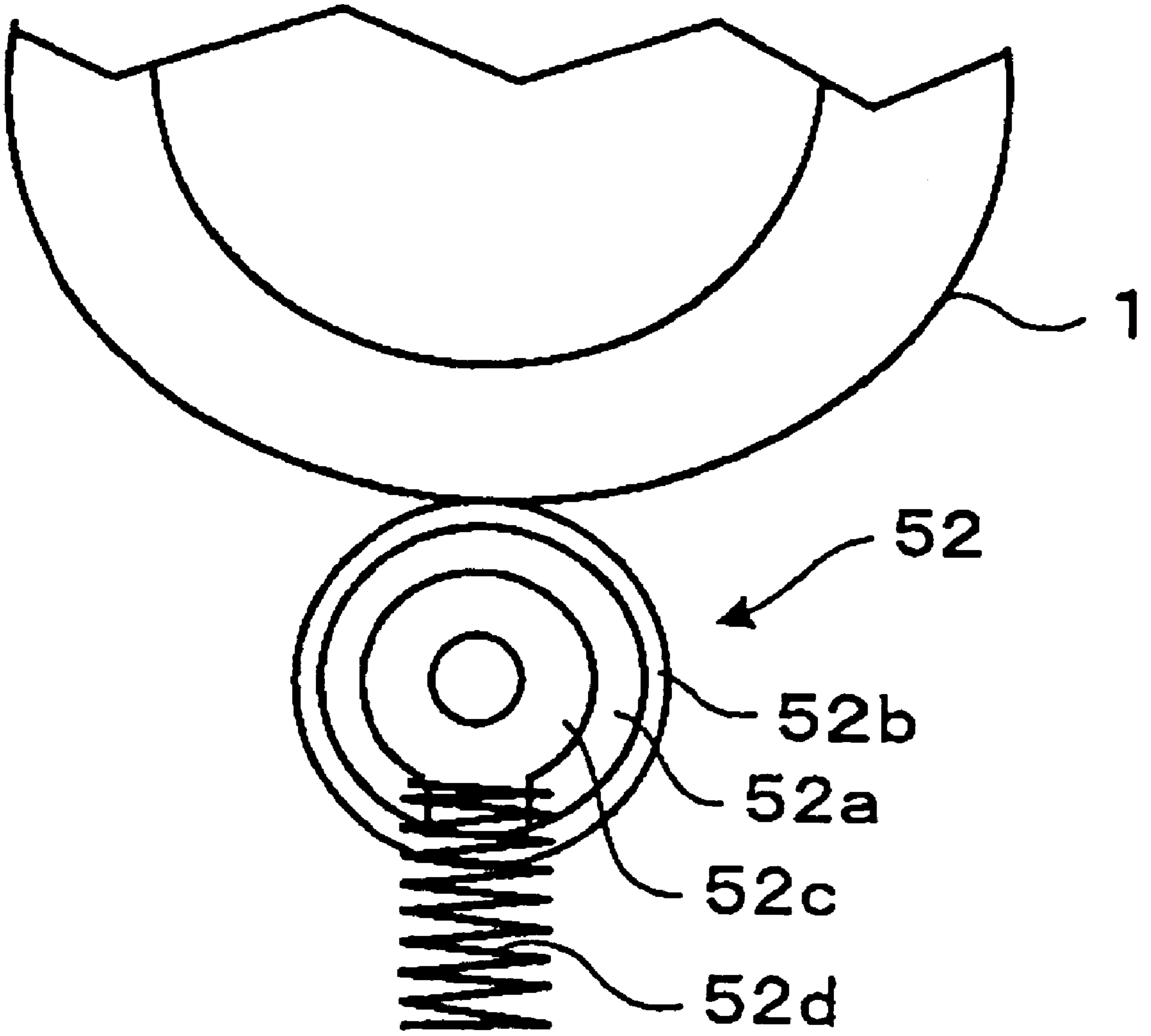
FIG. 3 is a view showing pressing means included in the illustrative embodiment for pressing an image transfer roller.

Reference will be made to FIG. 3 for describing the configuration of the image transfer roller 52 and a structure for pressing the roller 52. As shown, the image transfer roller 52 is made up of the metallic core 52*a* and an elastic layer 52*b* formed on the core 52*a*. The core 52*a* is formed of stainless steel (SUS), iron (Fe) or similar metal and provided with a diameter of 20 mm to 30 mm. The elastic layer 52*b* is formed solid by use of EPDM, silicone, NBR, urethane or similar material. More specifically, the elastic layer 52*b* is 0.1 mm to 1.0 mm thick and provided with hardness of 60° to 80° in Asker C scale when subject to a load of 1 kg and volumetric resistance of $1\times10^7$ Ω·cm to $1\times10^{11}$ Ω·cm. Optimally, the surface resistance of the elastic layer 52*b* should be higher than volumetric resistance by one or two figures.

The volumetric resistance of the image transfer roller 52 should preferably be lower than the volumetric resistance of the sheet P. When the volumetric resistance of the image transfer roller 52 is close to, preferably about one-tenth to one-hundredth of, the volumetric resistance of the sheet P, the electric resistance to act on the sheet P remains stable against the varying environment and roller deterioration. If the resistance of the sheet P is low, then there arise various problems, e.g., a problem that a bias power supply cannot follow the variation of the sheet P and a problem that the bias cannot be stably applied. Further, the surface resistance of the image transfer roller 52 should be higher than volumetric resistance, so that the electric field, acting in the same direction as the pressure, can transfer toner alone.

If the surface resistance of the image transfer roller 52 is lower than volumetric resistance, then the bias easily flows on the surface of the roller 52 as in the conventional image transfer system using a belt. This not only obstructs the efficient transfer of toner from the drum 1, but also causes the toner transferred to the sheet P to easily move and thereby blurs the toner image. In the illustrative embodiment, the surface resistance of the image transfer roller 52 is selected to be ten times to hundred times as high as volumetric resistance.

Figure 4:
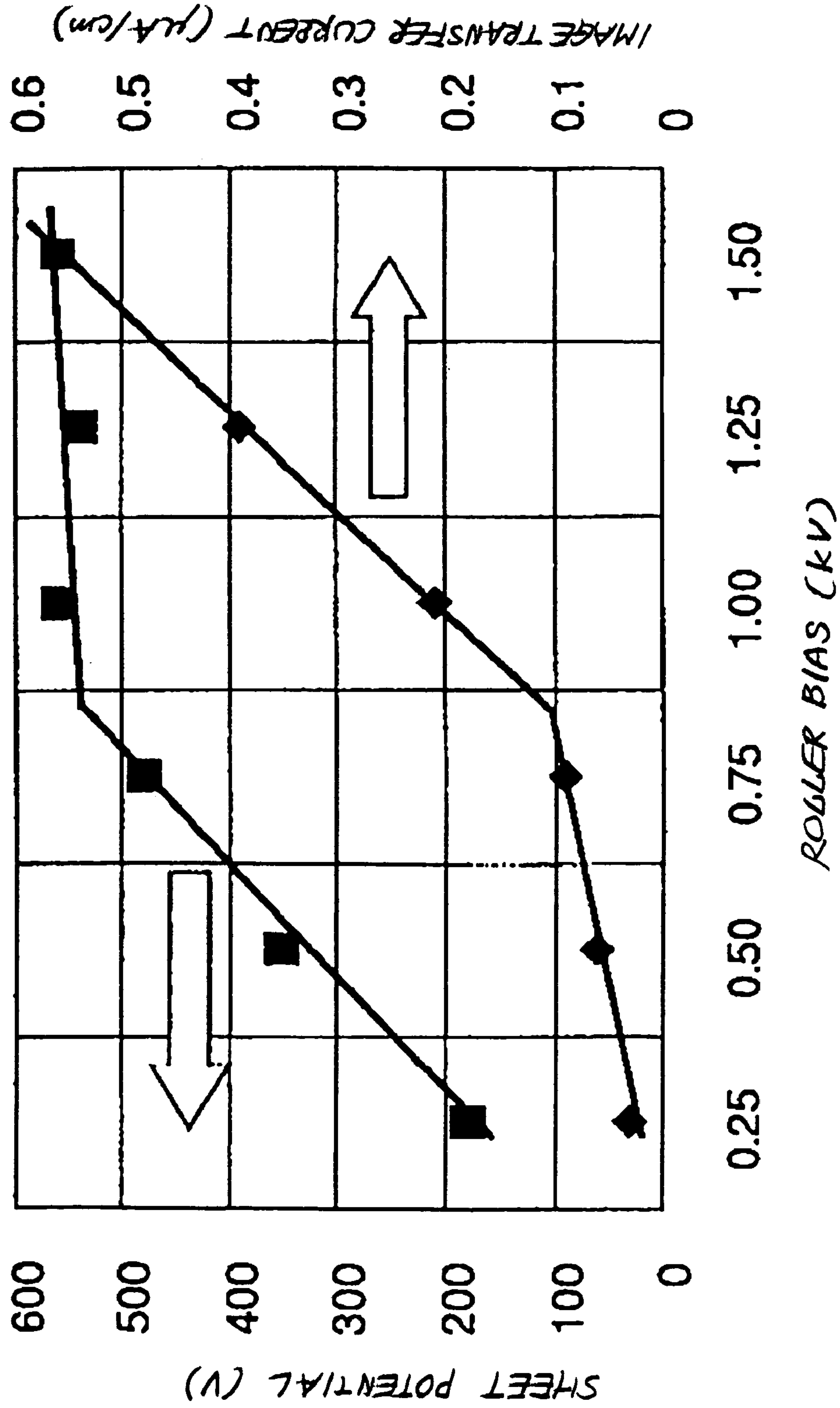
FIG. 4 is a graph showing a relation between the potential of a sheet and an image transfer current to hold when an image transfer bias is applied.

A method of determining the level of the bias for image transfer will be described with reference to FIG. 4. FIG. 4 lists the results of experiments conducted with the image forming apparatus of FIG. 2 by connecting a DC power supply between the core 52*a* of the image transfer roller 52 and the conductive base layer of the drum 1. The DC power supply applied a bias when a sheet Type 6000 was passed between the drum 1 and the image transfer roller 52. The resulting current and the potential of the sheet were measured. To measure the potential of the sheet, a surface potentiometer is positioned at the downstream side in the direction of sheet conveyance.

As FIG. 4 indicates, the potential of the sheet increases with an increase in bias, but saturates when the bias exceeds a limit. This transition is correlated to the current to flow through the sheet as well; the current at a limit point is about 1.0 μA/cm. The limit point refers to the upper limit of charge that the sheet allows, i.e., part of the bias exceeding the upper limit leaks to the drum 1 via the sheet. This proves that a component above the leak current effects the charge of toner deposited on the drum 1 or causes separation charge to occur.

On the other hand, image transfer efficiency reaches its peak when the current exceeds the limit point stated above. However, the actual peak appears at a current value above the limit point because a phase delay occurs due to the linear velocity of an image forming apparatus. It has therefore been customary to set the limit point at the maximum image transfer efficiency. Moreover, because the limit point varies in accordance with the kind of a sheet, environment and so forth, it has been customary to select a current higher than the limit point in order to attain sufficient image transfer efficiency despite the variation of the above factors and to simplify control.

We experimentally found that a sheet leaked and that the range where current higher than the leak was applied was causative of toner scattering and blur during image transfer and was a separation discharge range. By raising the image transfer pressure, which is an entirely new idea in the electrostatic image transfer systems field, the present invention makes it possible to implement high image transfer efficiency and enhances image quality even in the range of current lower than the limit point.

Considering the phase delay of an image forming apparatus as well, it may be considered that the optimum current range is +20% to −50% of the leak start current. Current above +20% brings about toner scattering and blur while current blow −50% degrades image transfer efficiency and makes the high image transfer pressure unique to the illustrative embodiment useless.

If the hardness of the elastic layer 52*b* of the image transfer roller 52 is low, then image transfer pressure to be described hereinafter cannot be achieved. The high image transfer pressure particular to the illustrative embodiment is achievable if the hardness is 40° or above. Hardness above 80° prevents the elastic layer 52*b* from following the uneven surface of a sheet and obstructs uniform pressing with scattered stress.

The thickness of the elastic layer 52*b* should be about ten times, preferably five times or more, as great as the amount of deformation ascribable to pressure. If the elastic layer 52*b* is thin, then the influence of the core 51*a* appears and makes the above target hardness unattainable. If the elastic layer 52*b* is thick, then the volumetric resistance of the image transfer roller 52 substantially increases above the target volume resistance although the target hardness may be attained. While the elastic layer 52*b* may be formed of any conventional elastic material so long as it lies in the range determined by hardness, volumetric resistance and so forth, the upper limit of thickness is substantially 3 mm.

In a specific example to be described hereinafter, the image transfer roller 52 was made up of an aluminum pipe having a diameter of 20 mm and a 1.0 mm thick EPDM layer formed on the pipe. The image transfer roller 52 had hardness of 65° and volumetric resistance of $1\times10^7$ Ω·cm, which matches a sheet TYPE 6000 whose volumetric resistance is $1\times10^9$ Ω·cm.

As shown in FIG. 3, the image transfer roller 52 is pressed against the drum 1 by a bearing 52*c* and a spring 52*d* positioned at one end of the roller 52. Another bearing and another spring are positioned at the other end of the roller 52 also. Let the pressing force be represented by a value (N/cm) produced by dividing the total bias of the springs, which act on the image transfer roller 52, by the length of the roller 52.

Figure 5A:
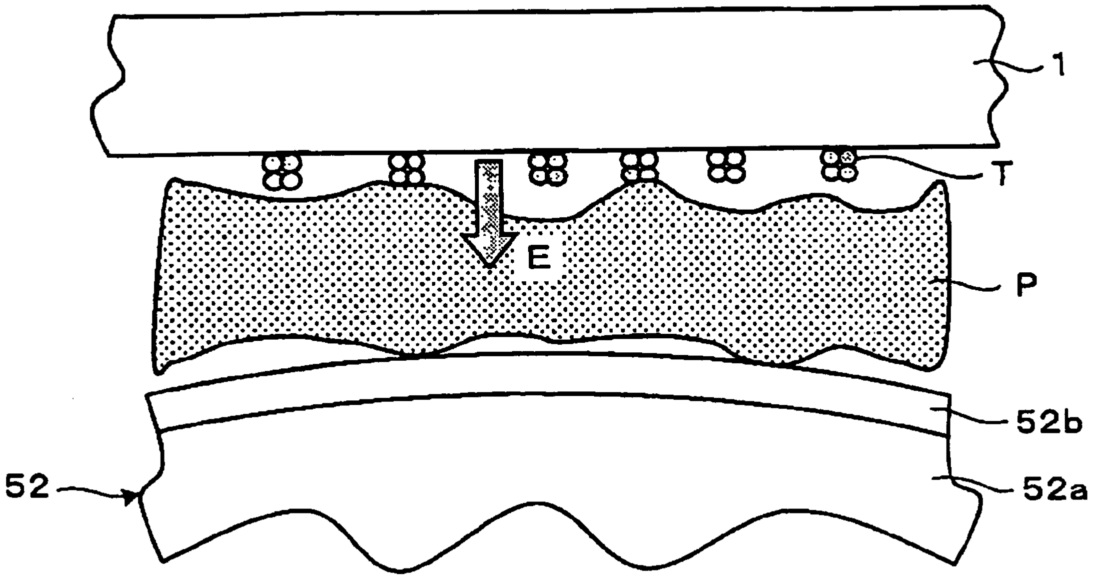
FIG. 5A PRIOR ART
FIG. 5A shows a conventional pressing condition for image transfer.
Figure 5B:
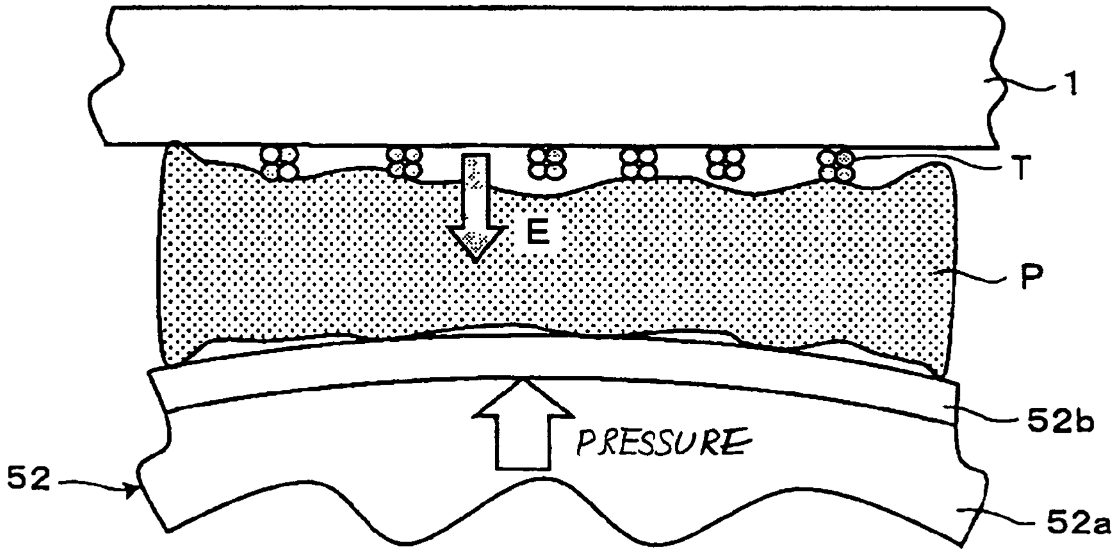
FIG. 5B shows a pressing condition unique to the illustrative embodiment.

Referring to FIGS. 5A and 5B, air gaps around toner grains T present when the drum 1 and image transfer roller 52 are pressed against each other. FIG. 5A shows a condition wherein the pressure is conventional 1N/cm or below. The sheet P is hard when its area is small or deforms, or bends, when the area is large. The conventional low pressure is received by several projections present on the uneven opposite surfaces of the sheet P. Consequently, the toner grains T and drum 1 and the sheet P contact each other only at a small number of points, causing many gaps to remain between the drum 1 and the image transfer roller 52. For experiment, pressure of 0.5 N/cm was applied between a photoconductive drum and a roller lacking the rubber layer or elastic layer 52*b*, and a sheet Type 6200 (trade name) also available from RICOH CO., LTD. was passed. For comparison, the pressure was varied to 1.0 N/cm with the other conditions being maintained the same. Measurement showed that the gaps under the above pressures were different by 20 μm, meaning that the pressure reduced the gaps by 20 μm.

FIG. 5B shows a condition particular to the illustrative embodiment. As shown, the pressure allows the projections of the sheet P and the drum 1 and image transfer roller 52 to contact each other at many points. Consequently, the gaps and therefore the mean distance between the toner grains T and the sheet P is reduced, so that the air gap g included in the denominator of the equation (2) decreases. Further, as the equation (2) indicates, if the toner layer T has uniform thickness and uniform surface roughness, then the mean gap successfully decreases.

As stated above, by reducing the air gap g, it is possible to cause an electric field identical with the conventional electric field to act on the sheet P even when the potential difference, acting on the image transfer roller 52 and drum 1, is reduced, thereby reducing toner scattering ascribable to separation discharge.

In the illustrative embodiment, the drum 1 should preferably have a coefficient of friction of 0.7 or below on its surface. Coefficients of friction above 0.7 would degrade the ability of the drum 1 to part from the toner T and would thereby lower image transfer efficiency. Particularly, in the illustrative embodiment that uses relatively cohesive toner, the coefficient of friction on the surface of the drum 1 should be small.

To reduce the coefficient of friction on the surface of the drum 1, while zinc stearate, calcium stearate, stearic acid or similar fatty acid metal salt may be evenly coated on the surface of the drum 1, the commonest method is adding such a substance to the toner T. To measure the coefficient of friction, use was made of a full-automatic frictional wear analyzer available from KYOWA INTERFACE SCIENCE CO., LTD. A stainless steel ball was used as a contactor.

The illustrative embodiment is similarly practicable with a photoconductive element made up of a conductive base and a photoconductive layer and a protection layer, which contains a metal oxide, formed on the base. Such a photoconductive element is mechanically strong enough to prevent the photoconductive layer from peeling for thereby insuring stable image quality. As for the metal oxide contained in the protection layer, there should preferably be selected one of alumina, titanium oxide and silica. For the protection layer, fluororesin or silicone resin added with various metallic oxides including silica, alumina, titanium oxide, barium titanate, magnesium titanate, calcium titanate, strontium titanate, zinc oxide and tin oxide is used for improving abrasion resistance. Particularly, alumina, titanium oxide and silica having a high film-shaving preventive effect are preferable.

Hereinafter will be described the characteristics, composition and production method of toner with which the illustrative embodiment is practicable. Toner has hardness of 7 to 12, preferably 8 to 11. Toner with hardness below 7 causes its grains to plastically deform and increase contact area when contacting each other with the result that cohesion increases and makes it difficult to uniform the toner layer. Toner with hardness above 12 is apt to degrade fixability although acceptable as far as image transfer is concerned.

While some different methods are available for controlling the hardness of toner, it is most effective to control the hardness of binder resin. Binder resin is contained in toner in a larger ratio than the other components and therefore effective to control the hardness of toner. To increase the hardness of binder resin, the molecular weight, crosslinking component (gel) or crosslinking degree is increased either singly or in combination. Alternatively, carbon black, inorganic fine powder or similar additive may be added to toner in order to increase hardness.

Conversely, to reduce hardness, the molecular weight, crosslinking component (gel) or crosslinking degree of binder resin is reduced either singly or in combination. Also, by controlling wax added to toner for improving fixability, it is possible to reduce hardness. It should be noted that when wax is added, it is important to control dispersion because wax varies toner hardness in accordance with the condition of dispersion as well.

To measure the hardness of toner, use is made of a fine compression tester MCTM-500 (trade name) available from Shimadzu Corp. Melted toner is rolled and cooled to form a flat plate. Subsequently, the surface of the plate is ground by #1200 abrasive paper and smoothed thereby. Thereafter, a load of 1.0 gf is applied to the plate to measure hardness five consecutive times so as to use the resulting mean value as hardness.

Toner should preferably have a certain cohesion degree. Cohesiveness should be 20% to 50%, more preferably 30% to 40%. Short cohesiveness is apt to cause toner grains to easily move individually and therefore move, when separation discharge occurs in the event of image transfer, along the disturbed electric field, resulting in toner scattering and blur. Excessive cohesiveness undesirably intensifies adhesion of toner to the drum 1 although intensifying adhesion of toner grains, degrading image transfer efficiency. Therefore, the advantages of the illustrative embodiment are achievable if cohesiveness that does not degrade toner deposition on the drum 1 is selected as an upper limit in combination with the coefficient of friction stated above.

The cohesiveness of toner may be represented by a cohesion degree (%); the greater the cohesion degree, the stronger the cohesion of toner. For the measurement of the cohesion degree, a powder tester Type PT-N available from HOSOKAWA MICRON CORP. is used. The powder tester is operated in accordance with an operation manual attached thereto except that meshes of 75 μm, 45 μm and 22 μm are used and that the vibration time is 30 seconds.

In the illustrative embodiment, toner should preferably have volumetric resistance of $1\times10^9$ μ·cm or above. Volumetric resistance below $1\times10^9$ μ·cm lowers image transfer efficiency and degrades image quality. To measure the volumetric resistance of toner, 3.0 g of toner is subjected to a load of 6 t/cm$^2$ to form a disk-like pellet whose diameter is 40 mm. Subsequently, volumetric resistance is measured by use of a dielectric loss measuring device TR-10C available from ANDO ELECTRIC CO., LTD. Frequency and ratio used for measurement are 1 kHz and $11\times10^{-9}$, respectively.

As for the binder included in the toner of the illustrative embodiment, any one of conventional resins may be used. Examples of the conventional resins are styrene, poly-α-stilstyrene, ethylene-ethyl acrylate copolymer, xylene resin and polyvinyl butyral resin.

Any one of conventional parting agents may be used for the toner of the illustrative embodiment. Particularly, free fatty acid freed carnauba wax, montan wax or oxidized rice wax may be used either singly or in combination.

As for an external additive, inorganic fine particles may preferably be used. Examples of inorganic fine particles are silica, alumina, titanium oxide, barium titanate, magnesium titanate, calcium titanate, calcium carbonate, silicon carbide, and silica nitride.

The toner of the illustrative embodiment may additionally contain a charge control agent, as needed. While all the known charge control agents are applicable, use may be made of Nigrosine-based dye, triphenylmethane-based dye, fluorine-based activator, metal salicylate or a metallic salt of salicylic acid derivatives.

All the pigments and dyes customarily used as colorants for toner can be used as a colorant for the toner of the illustrative embodiment. For example, use may be made of carbon black, lamp black, iron black, ultramarine, a Nigrosine dye, Aniline Blue, Calcoil Blue, oil black or azoil black.

Any conventional method may be used to produce the toner of the illustrative embodiment. For example, the binder resin, magnetic material, parting agent, colorant and, if necessary, charge control agent are mixed in a mixer, kneaded by a heat roll, extruder or similar kneader, cooled for solidification, pulverized by a jet mill, turbojet, or kriptron, and then classified.

To add the inorganic fine particles, fatty acid metal salt or the like, a supermixer, Henchel mixer or similar mixer is used.

Examples of the illustrative embodiment will be described hereinafter. Toner prescriptions and toner characteristics corresponding thereto are listed in FIG. 9. Toners used in the examples will be distinguished by Prescription No.

[Prescription No. 1]

| | |
|---|---|
| polyester resin<br>(weight-mean molecular weight:<br>310,000, Tg: 65° C.) | 44 pts. wt. |

-continued

| | |
|---|---|
| styrene-n-butylacrylate copolymer<br>(weight-mean molecular weight: 85,000, Tg: 68° C.) | 40 pts. wt. |
| carnauba wax | 5 pts. wt. |
| carbon black<br>(#44 available from Mitsubishi Chemical Co. Ltd.) | 10 pts. wt. |
| charge controlling agent<br>(Spiron Black TR-H available from<br>Hodogaya Chemical Co. Ltd.) | 1 pts. wt. |

The above mixture was kneaded at 130° C. by a biaxial extruder, pulverized by a mechanical pulverizer, and then classified into a weight-mean grain size of 8.5 μm. Subsequently, 0.2 wt. % of silica R-972 available from Japan Aerosil Co. Ltd. was blended by a Henchel mixer. The toner had hardness of 8, a cohesion degree of 45%, and volumetric resistance of $8.5\times10^8$ Ω·cm.

The surface of the photoconductive element had a coefficient of friction of 0.75.

[Prescription No. 2]

| | |
|---|---|
| polyester resin<br>(weight-mean molecular weight:<br>185,000, Tg: 67° C.) | 71 pts. wt. |
| carnauba wax<br>(mean grain size: 300 μm) | 3 pts. wt. |
| iron tritetraoxide<br>(EPT-1000 available from<br>Toda Industries Co. Ltd.) | 15 pts. wt. |
| carbon black (#44) | 10 pts. wt. |
| charge control agent<br>(Spiron Black TR-H) | 1 pts. wt. |

The above mixture was kneaded at 160° C. by a biaxial extruder, pulverized by a mechanical pulverizer, and then classified into a weight-mean grain size of 5.5 μm. Subsequently, 1.0 wt. % of silica R-972 was blended by a Henchel mixer to obtain the toner. The toner had hardness of 11, a cohesion degree of 8.0%, and volumetric resistance of $5.5\times10^8$ Ω·cm.

The surface of the photoconductive element had a coefficient of friction of 0.75.

[Prescription No. 3]

| | |
|---|---|
| styrene/n-butylmethacrylate/2-ethylhexylacrylate<br>copolymer<br>(composition ratio: 75/10/15, weight-mean<br>molecular weight: 210,000, Tg: 57° C.) | 55 pts. wt. |
| polyester resin<br>(weight-mean molecular weight:<br>160,000, Tg: 64° C.) | 23 pts. wt. |
| polyethylene wax (molecular weight 900) | 10 pts. wt. |
| carbon black (#44) | 10 pts. wt. |
| charge control agent<br>(Spiron Black TR-H) | 2 pts. wt. |

The above mixture was kneaded at 90° C. by a biaxial extruder, pulverized by a pneumatic pulverizer, and then classified into a weight-mean grain size of 7.5 μm. Subsequently, 0.2 wt. % of silica R-972 was blended by a Henchel mixer to obtain toner. The toner had hardness of 6, a cohesion degree of 55.0%, and volumetric resistance of $8.8\times10^8$ Ω·cm. The surface of the photoconductive element had a coefficient of friction of 0.75.

[Prescription No. 4]

| | |
|---|---|
| polyester resin (weight-mean molecular weight: 274,000, Tg: 68° C.) | 79 pts. wt. |
| polyethylene wax (molecular weight: 900) | 3 pts. wt. |
| carbon black (#44) | 15 pts, wt. |
| charge control agent (Spiron Black TR-H) | 3 pts. wt. |

The above mixture was kneaded at 150° C. by a biaxial extruder, pulverized by a pneumatic pulverizer, and then classified into a weight-mean grain size of 9.5 μm. Subsequently, 1.0 wt. % of silica R-972 was mixed by a Henchel mixer to obtain toner.

The toner had hardness of 14, a cohesion degree of 8.5%, and volumetric resistance of $4.2\times10^{8}$ Ω·cm. The surface of the photoconductive element had a coefficient of friction of 0.75.

[Prescription No. 5]

| | |
|---|---|
| polyester resin (weight-mean molecular weight: 310,000, Tg: 65° C.) | 49 pts. wt. |
| styrene-n-butylacrylate copolymer (weight-mean molecular weight: 85,000, Tg: 68° C.) | 35 pts. wt. |
| carnauba wax | 4 pts. wt. |
| carbon black (#44) | 10 pts. wt. |
| charge control agent (Spiron Black TR-H) | 2 pts. wt. |

The above mixture was kneaded at 130° C. by a biaxial extruder, pulverized by a mechanical pulverizer, and then classified into a weight-means grain size of 8.5 μm. subsequently, 0.75 wt. % of silica R-972 was blended by a Henchel mixer to obtain toner.

The toner had hardness of 10, a cohesion degree of 15%, and volumetric resistance of $9.5\times10^{8}$ Ω·cm. The surface of the photoconductive element had a coefficient of friction of 0.75.

[Prescription No. 6]

| | |
|---|---|
| polyester resin (weight-mean molecular weight: 185,000, Tg: 67° C.) | 73 pts. wt. |
| carnauba wax (mean grain size: 300 μm) | 5 pts. wt. |
| iron tritetraoxide (EPT-1000) | 10 pts. wt. |
| carbon black (#44) | 10 pts. wt. |
| charge control agent (Spiron Black TR-H) | 2 pts. wt. |

The above mixture was kneaded at 160° C. by a biaxial extruder, pulverized by a mechanical pulverizer, and then classified into a weight-mean grain size of 6.5 μm. Subsequently, 1.0 wt. % of silica R-972 was blended by a Henchel mixer to obtain toner.

The toner had hardness of 11, a cohesion degree of 38.0%, and volumetric resistance of $9.8\times10^{8}$ Ω·cm. The surface of the photoconductive element had a coefficient of friction of 0.75.

[Prescription No. 7]

| | |
|---|---|
| polyester resin (weight-mean molecular weight: 310,000, Tg: 65° C.) | 56 pts. wt. |
| styrene-n-butylacrylate copolymer (weight-mean molecular weight: 85,000, Tg: 68° C.) | 35 pts. wt. |
| carnauba wax | 3 pts. wt. |
| carbon black (#44) | 5 pts. wt. |
| charge control agent (Spiron Black TR-H) | 1 pts. wt. |

The above mixture was kneaded at low temperature of 80° C. by a biaxial extruder, pulverized by a mechanical pulverizer, and then classified into a weight-mean grain size of 8.5 μm. Subsequently, 1.0 wt. % of silica R-972 was blended by a Henchel mixer to obtain toner.

The toner had hardness of 10, a cohesion degree of 25.0%, and volumetric resistance of $3.5\times10^{9}$ Ω·cm. The surface of the photoconductive element had a coefficient of friction of 0.75.

[Prescription No. 8]

| | |
|---|---|
| polyester resin (weight-mean molecular weight: 310,000, Tg: 65° C.) | 56 pts. wt. |
| styrene-n-butylacrylate copolymer (weight-mean molecular weight: 85,000, Tg: 68° C.) | 35 pts. wt. |
| carnauba wax | 3 pts. wt. |
| carbon black (#44) | 5 pts. wt. |
| charge control agent (Spiron Black TR-H) | 1 pts. wt. |

The above mixture was kneaded at low temperature of 80° C. by a biaxial extruder, pulverized by a mechanical pulverizer, and then classified into a weight-mean grain size of 8.5 μm. Subsequently, 1.0 wt. % of silica R-972 and 0.20 pts. wt. of fine powder of zinc stearate were blended by a Henchel mixer to obtain toner.

The toner had hardness of 10, a cohesion degree of 35.0%, and volumetric resistance of $1.8\times10^{9}$ Ω·cm. The surface of the photoconductive element had a coefficient of friction of 0.60 when the above toner was used.

FIG. 9 lists characteristics determined with the toners having Prescriptions 1 through 8.

Figure 6:
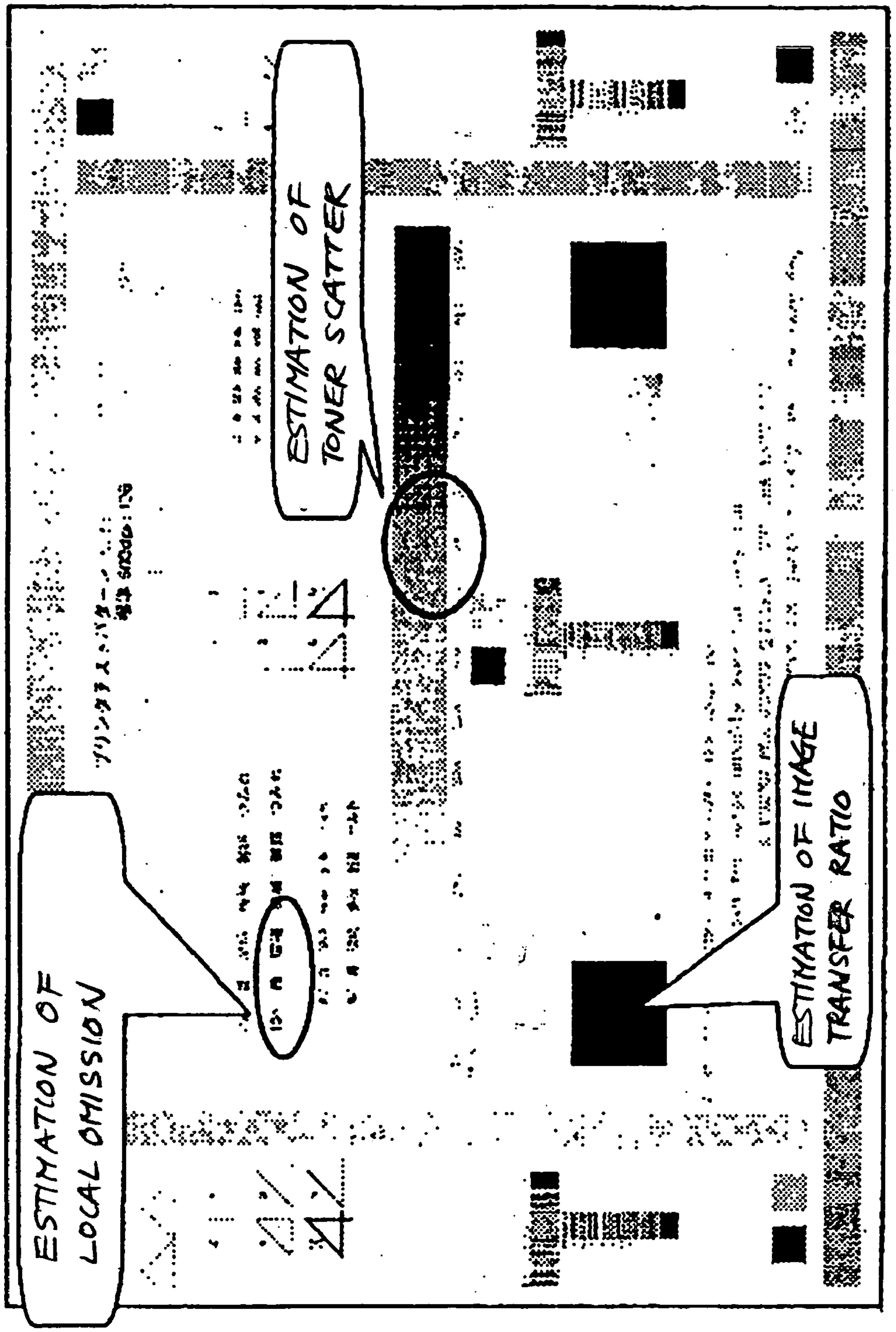
FIG. 6 shows a specific test chart.

How the illustrative embodiment estimates image transfer ratio, fixability, toner scattering and local omission of an image will be described hereinafter. For estimation, an image transfer section included in a copier Imagio MF7070 available from RICOH CO., LTD. was modified. As for the rest of the configuration, the copier identical with the apparatus shown in FIG. 2. Development was effected with a two-component type developer, i.e., a toner and carrier mixture while image transfer was effected with a roller. Fixation was effected with pressure of 9.3 N/cm$^2$ at 165° C. to 185° C. FIG. 6 shows a specific test chart used for estimation and mainly constituted by gray scale having resolution of 600 dpi (dots per inch).

To estimate an image transfer ratio, the test chart developed on the drum 1 is transferred to a sheet P. Subsequently, the copier is caused to stop operating when the sheet P is present on the belt conveyor 53. Thereafter, an adhesive tape is adhered to the black solid portion of the test chart on the drum 1 and then removed to determine the amount of toner left on the drum 1 after image transfer.

On the other hand, a black solid portion, carrying transferred toner, is cut out and then blown away by compressed air. The amount of transferred toner is determined on the basis of weights before and after the blowing. Subsequently, an image transfer ratio (%) is determined by use of:

$$(\text{transferred toner})/(\text{transferred toner}+\text{residual toner}))\times 100 \quad (3)$$

The allowable image transfer ratio is 70% or above in the general environment. The image transfer is determined to be high (O) if 80% or above, determined to be medium (Δ) if 70% to 79% or determined to be low (X) if 69% or below.

Fixability is determined by a smear method. More specifically, a piece of cloth attached to a weight of 8 N/ϕ15 is repeatedly moved back and forth five times on the halftone portion of a sheet P having image density (ID) of 0.6 to 0.8. Thereafter, density on the cloth is estimated. Fixability is determined to be high (O) if 0.3 or below, determined to be allowable if 0.5 or below (Δ) or determined to be low (X) if 0.51 or above.

Figure 7:
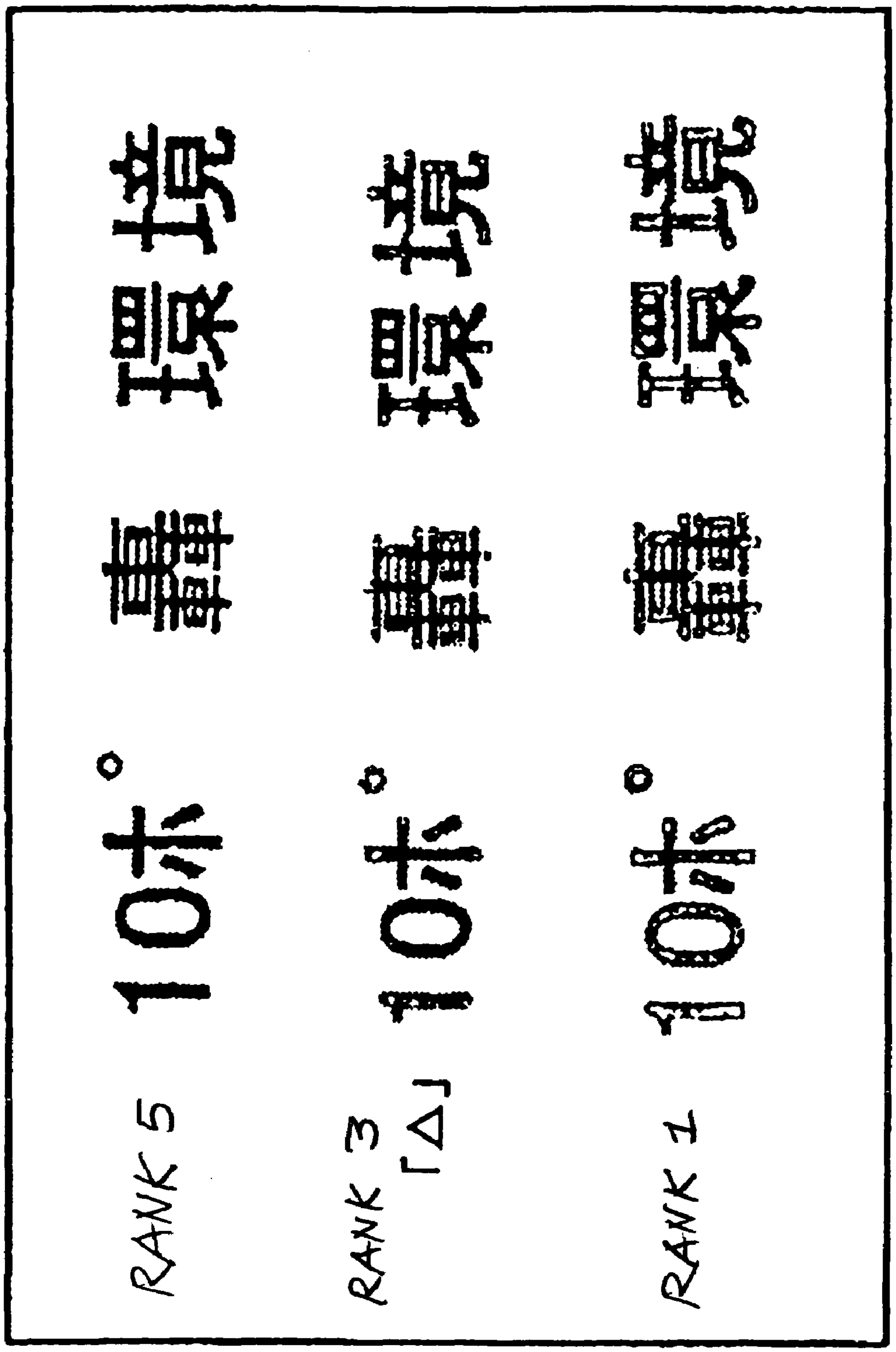
FIG. 7 shows a specific rank pattern for estimating local omission of an image.
Figure 8:
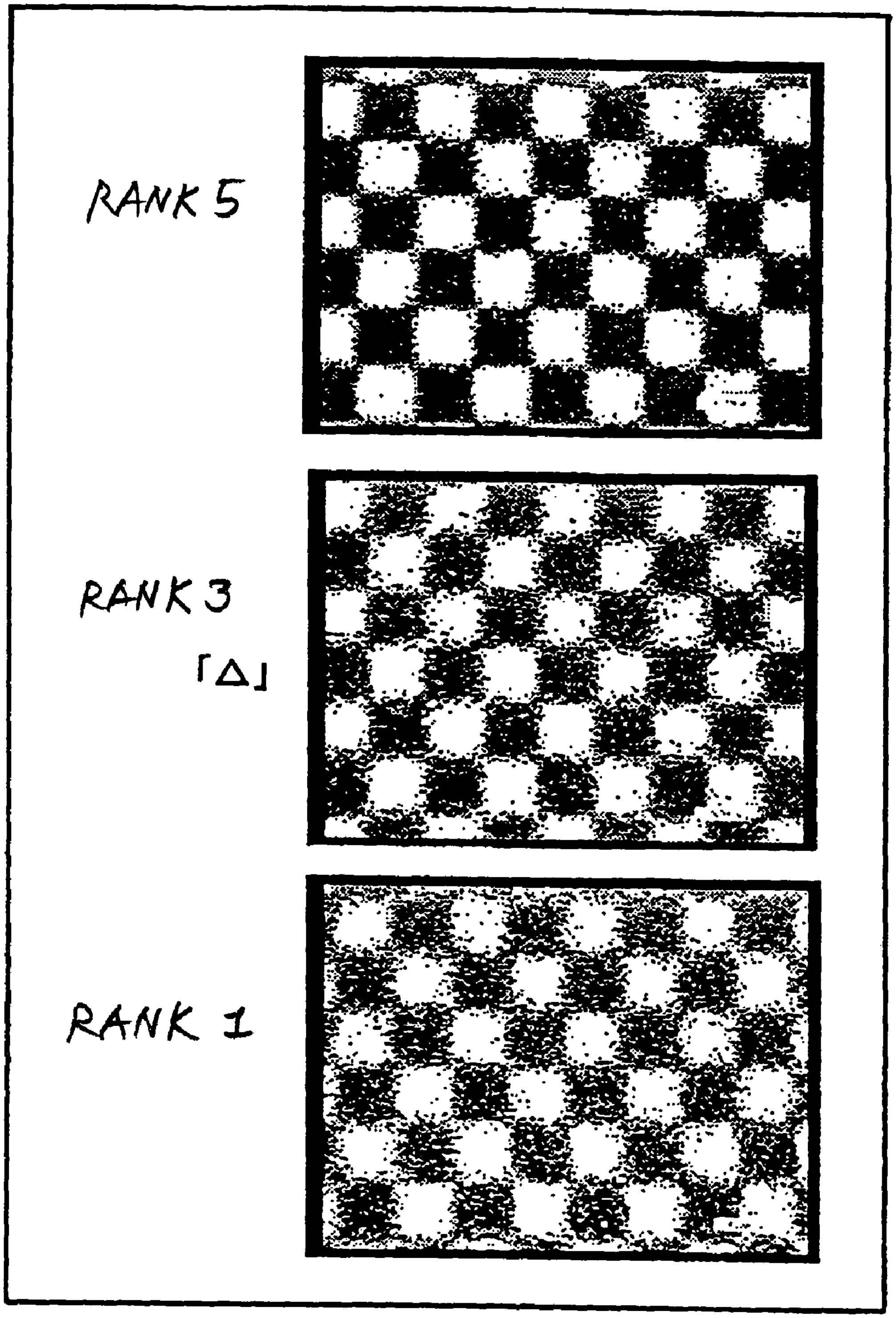
FIG. 8 shows a specific rank pattern for estimating toner scattering.

As for toner scattering and local omission, because no general methods for estimation have been established, samples are compared with rank patterns by eye. FIGS. 7 and 8 respectively show a specific rank pattern of local omission and a specific rank pattern of toner scattering used for estimation. Images are allowable (Δ) if belonging to rank 3, OK if belonging to rank 4 or above or NG if belonging to ranks below 3.

Examples 1 and 2 of the illustrative embodiment will be described hereinafter.

EXAMPLE 1

Imagio MF7070 with the modified image transfer section was used for estimation. To stabilize contact of the drum 1 and image transfer roller 52, a rubber layer or elastic layer with hardness of 65° in Asker C scale under a load of 1 kg and resistance of $1\times10^{7}$ Ω·cm was formed on the surface of the image transfer roller 52. The test chart of FIG. 6 was printed with the image transfer pressure implemented by the springs 52*d*, FIG. 3, being set at 0.5 N/cm, 1.0 N/cm, 5.0 N/cm and 10.0 N/cm. At the same time, the voltage applied between the image transfer roller 52 and the drum 1 was so controlled as to establish current levels of 0.03 μA/cm, 0.05 μA/cm, 0.2 μA/cm and 0.3 μA/cm. Use was made of sheets Type 6000 and a developer having Prescription No. 8 stated earlier.

FIGS. 10, 11 and 12 list the results of estimation of image transfer ratio, toner scattering and local omission, respectively. It has been customary to use current of about 0.3 μA/cm to 0.4 μA/cm and pressure of about 1 N/cm for image transfer.

As FIGS. 10 through 12 indicate, the image transfer ratio is not acceptable when the current is lower than 0.05 μA/cm. If the pressure is low and if the current is low, then the image transfer ratio is low. Toner scattering ascribable to discharge is noticeable when the current is 0.3 μA/cm or above. Further, when the pressure is 10 N/cm, local omission is about to occur with the result that the image transfer ratio is lowered. Thus, the combination of pressure of 1 N/cm to 10 N/cm and current of 0.05 μA/cm to 0.2 μA/cm is desirable. The optimum pressure and current were 1.0 N/cm to 5.0 N/cm and 0.1 μA/cm to 0.15 μA/cm, respectively, as determined by experiments.

[Experiment 2]

Developers with Prescriptions 1 through 8 stated earlier were produced by the same method as in Example 1. Carrier grains were implemented by spherical ferrite grains having a weight-mean grain size of 50μ and coated with silicone resin. The carrier content of each developer was 5.0 wt. %. The test chart of FIG. 6 was printed by the pressure of 3 N/cm and current of 0.1 μA/cm. Again, sheets Type 6000 were used. Estimation was made in terms of image transfer ratio and toner scattering. The results of estimation are shown in FIG. 13.

As FIG. 13 indicates, the coefficient of friction of the drum 1 effects the image transfer ratio more in relation to the cohesion of toner than alone. If the volumetric resistance of toner is low, it effects the image transfer ratio, but does not noticeably effect toner scattering. As for toner scattering, toner hardness should be high, but no improvements are achievable unless pressure is varied in relation to toner cohesion. In the case of Prescription No. 3, for example, the toner scattering rank was improved from "Δ" to "○" when current was reduced from 0.1 μA/cm to 0.05 μA/cm.

While the image transferring means has been shown and described as being a roller, the illustrative embodiment is similarly practicable with an endless belt. Further, toner scattering can be reduced even if the various conditions, combined in the illustrative embodiment, each are controlled alone. For example, the cohesion degree of toner may be increased without regard to the hardness of toner.

In summary, it will be seen that the present invention provides an image forming apparatus having various unprecedented advantages, as enumerated below.

(1) Sufficient pressure is caused to act between an image carrier and image transferring means, so that the number of points where the image carrier and a sheet contact and therefore image transfer efficiency increases. At the same time, an electric field for image transfer can be weakened to such a degree that separation discharge does not occur. This insures high quality images free from defects.

(2) Optimum toner hardness is selected to protect toner from deformation ascribable to the high pressure, thereby reducing toner scattering, blur and other defects ascribable to image transfer.

(3) The image transferring means has volumetric resistance lying in a range of from one equal to the volumetric resistance of a sheet to one that is one-hundredth of the same, so that the electric field to act on the sheet is stable.

(4) The surface resistance of the image transferring means is higher than volumetric resistance, so that the electric field, acting in the same direction as the pressure, can transfer toner alone. This enhances image transfer efficiency.

(5) To form the electric field around toner, current lower than one that causes the sheet to leak, but higher than one that implements electrostatic image transfer, is applied. Therefore, high image transfer efficiency is achievable with small image transfer energy while toner scattering is reduced.

(6) The current for image transfer can be reduced.

(7) Toner scattering ascribable to separation discharge is reduced.

(8) Even when air gaps exist between the image carrier and the sheet, toner is accurately prevented from randomly moving and being scattered.

(9) A decrease in image transfer ratio ascribable to a high toner cohesion degree and therefore toner scattering is reduced.

(10) The image carrier and toner can easily part from each other despite the high toner cohesion degree, also enhancing image transfer efficiency.

What is claimed is:

1. An image forming apparatus comprising:

image transferring means for electrostatically transferring a toner image formed on an image carrier to a recording medium;

means for applying pressure between said image carrier and said image transferring means;

toner with a hardness sufficient to prevent deformation due to the pressure wherein a potential difference between said image carrier and the recording medium is reduced, based on the pressure, while maintaining a same electric field, directly proportional to the potential difference, between said image carrier and the recording medium and around the toner therebetween.

2. The apparatus as claimed in claim 1, wherein the pressure is between 1 N/cm and 10 N/cm.

3. The apparatus as claimed in claim 2, wherein the hardness of the toner is between 7 and 12.

4. The apparatus as claimed in claim 2, wherein said image transferring means has a volumetric resistance that is equal to a volumetric resistance of the recording medium to one-hundredth of said volumetric resistance.

5. The apparatus as claimed in claim 4, wherein said image transferring means has a surface resistance higher than the volumetric resistance of said image transferring means.

6. The apparatus as claimed in claim 2, wherein to form the electric field around the toner, a current equal to or lower than a current that causes the recording medium to leak, but equal to or higher than a current implementing electrostatic image transfer, is applied.

7. The apparatus as claimed in claim 2, wherein said image transferring means comprises an elastic layer having a hardness of 60° to 80° on a surface thereof.

8. The apparatus as claimed in claim 7, wherein said elastic layer has a thickness ten times or more as great as an amount of deformation ascribable to the pressure.

9. The apparatus as claimed in claim 7, wherein said image transferring means comprises a roller comprising a conductive metallic core.

10. The apparatus as claimed in claim 2, wherein the toner has a cohesion degree of 20% to 50%.

11. The apparatus as claimed in claim 1, wherein said image transferring means has a volumetric resistance that is equal to a volumetric resistance of the recording medium to one-hundredth of said volumetric resistance.

12. The apparatus as claimed in claim 11, wherein said image transferring means has a surface resistance higher than the volumetric resistance of said image transferring means.

13. The apparatus as claimed in claim 1, wherein to form the electric field around the toner, a current equal to or lower than a current that causes the recording medium to leak, but equal to or higher than a current implementing electrostatic image transfer, is applied.

14. The apparatus as claimed in claim 1, wherein said image transferring means comprises an elastic layer having a hardness of 60° to 80° on a surface thereof.

15. The apparatus as claimed in claim 14, wherein said elastic layer has a thickness ten times or more as great as an amount of deformation ascribable to the pressure.

16. The apparatus as claimed in claim 14, wherein said image transferring means comprises a roller comprising a conductive metallic core.

17. The apparatus as claimed in claim 1, wherein the toner has a cohesion degree of 20% to 50%.

18. The apparatus as claimed in claim 1, wherein the toner comprises an insulative toner having a volumetric resistance of $1\times10^9$ Ω·cm or above.

19. The apparatus as claimed in claim 1, wherein a surface of said image carrier has a coefficient of friction of 0.7 or below.

20. An image forming apparatus comprising:

image transferring means for electrostatically transferring a toner image formed on an image carrier to a recording medium;

means for applying a pressure between said image carrier and said image transferring device;

toner with a cohesion degree sufficient to prevent deformation due to the pressure, wherein a potential difference between said image carrier and the recording medium is reduced, based on the pressure, while maintaining a same electric field, directly proportional to the potential difference, between said image carrier and the recording medium and around the toner therebetween.

21. The apparatus as claimed in claim 20, wherein the cohesion degree of the toner is between 20% and 50%.

22. The apparatus as claimed in claim 20, wherein the toner comprises an insulative toner having a volumetric resistance of $1\times10^9$ Ω·cm or above.

23. The apparatus as claimed in claim 20, wherein a surface of said image carrier has a coefficient of friction of 0.7 or below.

24. A method of electrostatically transferring a toner image formed on an image carrier to a recording medium with image transferring device, comprising:

applying a pressure between said image carrier and said image transferring means;

providing toner with a hardness sufficient to prevent deformation due to the pressure;

and reducing a potential difference between said image carrier and the recording medium while maintaining a same electric field, directly proportional to the potential difference, between said image carrier and the recording medium and around the toner therebetween.

25. A method of electrostatically transferring a toner image formed on an image carrier to a recording medium with image transferring device, comprising:

applying a pressure between said image carrier and said image transferring means;

providing a toner with a cohesion degree sufficient to prevent deformation due to the pressure; and reducing a potential difference between said image carrier and the recording medium while maintaining a same electric field, directly proportional to the potential difference, between said image carrier and the recording medium and around the toner therebetween.

* * * * *